(12) United States Patent
Fox

(10) Patent No.: US 9,323,766 B2
(45) Date of Patent: Apr. 26, 2016

(54) DATA COLLECTION DEVICE AND METHOD

(71) Applicant: Metrix Instrument Co., LP, Houston, TX (US)

(72) Inventor: Jonathan Fox, Gardnerville, NV (US)

(73) Assignee: Metrix Instrument Co., LP, Houston, TX (US)

(*) Notice: Subject to any disclaimer, the term of this patent is extended or adjusted under 35 U.S.C. 154(b) by 166 days.

(21) Appl. No.: 14/212,769

(22) Filed: Mar. 14, 2014

(65) Prior Publication Data

US 2014/0280388 A1 Sep. 18, 2014

Related U.S. Application Data

(60) Provisional application No. 61/794,106, filed on Mar. 15, 2013.

(51) Int. Cl.
*G06F 17/30* (2006.01)

(52) U.S. Cl.
CPC .............................. *G06F 17/30091* (2013.01)

(58) Field of Classification Search
None
See application file for complete search history.

(56) References Cited

U.S. PATENT DOCUMENTS

| | | | |
|---|---|---|---|
| 5,623,109 A | 4/1997 | Uchida et al. |
| 5,631,825 A | 5/1997 | van Weele et al. |
| 5,675,752 A | 10/1997 | Scott et al. |
| 5,870,699 A | 2/1999 | Canada et al. |
| 5,875,420 A | 2/1999 | Piety et al. |
| 5,895,857 A | 4/1999 | Robinson et al. |
| 5,922,963 A | 7/1999 | Piety et al. |
| 5,943,634 A | 8/1999 | Piety et al. |
| 6,092,029 A | 7/2000 | Bently |
| 6,192,325 B1 | 2/2001 | Piety et al. |
| 6,421,571 B1 | 7/2002 | Spriggs et al. |
| 6,507,804 B1 | 1/2003 | Hala et al. |
| 6,662,118 B2 | 12/2003 | Carle et al. |
| 6,671,633 B2 | 12/2003 | Kramb et al. |
| 6,701,258 B2 | 3/2004 | Kramb et al. |
| 6,704,668 B2 | 3/2004 | Bibelhausen et al. |
| 6,711,527 B2 | 3/2004 | Bibelhausen et al. |
| 6,714,880 B2 | 3/2004 | Carle et al. |

(Continued)

FOREIGN PATENT DOCUMENTS

KR 20100095800 9/2010

OTHER PUBLICATIONS

International Search Report for corresponding PCT Application No. PCT/US2014/030209 dated Aug. 26, 2014.

*Primary Examiner* — Hung Q Pham
(74) *Attorney, Agent, or Firm* — Ceasar Rivise, PC

(57) ABSTRACT

The storage allocation system reduces the amount of storage needed to store data, and also to store the most interesting dynamic data samples (e.g., waveforms). Dynamic data is relevant if it has changed from a previous sample. Changes need to be detected for different machinery conditions. The storage allocation approach normalizes static data to a percentage of danger alarm value that indicates how much the data is changing. The difference of successive percent of danger alarm values provides an instantaneous change value indicating how interesting the data is. To manage how much data is collected; the system maintains an interestingness threshold and stores data samples having an interestingness value above the threshold. The threshold is automatically adjusted if too much/little data is being saved. This approach optimizes the amount and value of data stored and data storage requirements for improved data storage efficiency.

20 Claims, 4 Drawing Sheets

(56) References Cited

U.S. PATENT DOCUMENTS

| | | |
|---|---|---|
| 6,768,949 B2 | 7/2004 | Shupe et al. |
| 6,775,576 B2 | 8/2004 | Spriggs et al. |
| 6,789,025 B2 | 9/2004 | Boerhout |
| 6,799,139 B2 | 9/2004 | Slates |
| 6,816,816 B2 | 11/2004 | Slates et al. |
| 6,839,660 B2 | 1/2005 | Eryurek et al. |
| 6,889,096 B2 | 5/2005 | Spriggs et al. |
| 6,912,484 B2 | 6/2005 | Bibelhausen et al. |
| 6,915,235 B2 | 7/2005 | Reeves et al. |
| 7,027,959 B2 | 4/2006 | Hayzen et al. |
| 7,030,746 B2 | 4/2006 | Littrell et al. |
| 7,249,287 B2 | 7/2007 | Littrell |
| 7,289,919 B2 | 10/2007 | Boerhout |
| 7,305,326 B2 | 12/2007 | Hayzen et al. |
| 7,538,664 B2 | 5/2009 | Doreglo et al. |
| 7,593,784 B2 | 9/2009 | Carle et al. |
| 7,647,131 B1 | 1/2010 | Sadowski et al. |
| 7,657,333 B2 | 2/2010 | Bradford et al. |
| 8,174,402 B2 | 5/2012 | Bouse et al. |
| 8,988,238 B2 * | 3/2015 | Hatch ............... G05B 19/4065 340/540 |
| 2003/0009482 A1 | 1/2003 | Benerjee et al. |
| 2008/0097718 A1 | 4/2008 | Nelson |
| 2008/0097724 A1 | 4/2008 | Morris et al. |
| 2008/0114571 A1 | 5/2008 | Campbell et al. |
| 2008/0183863 A1 | 7/2008 | Hess et al. |
| 2009/0082919 A1 | 3/2009 | Hershey et al. |
| 2012/0173832 A1 | 7/2012 | Post et al. |
| 2012/0173883 A1 | 7/2012 | Orsini et al. |

\* cited by examiner

|                     | Period 1 | Period 2 | Period 3 |
|---------------------|----------|----------|----------|
| Max Percent of danger | 1.1%   | 3%       | 2.2%     |
| Previous Value      | 1%       | 1.1%     | 3%       |
| Interestingness     | 0.1%     | 1.9%     | 0.8%     |
| Threshold           | 0.1%     | 0.1%     | 1.0%     |
| Collect Sample?     | No       | Yes      | No       |

FIG. 2

|                                | Period 1 | Period 2 | Period 3 |
|--------------------------------|----------|----------|----------|
| % of danger                    | 1.2%     | 1.4%     | 1.6%     |
| Previous % of danger           | 1%       | 1.2%     | 1.4%     |
| Interestingness                | 0.2%     | 0.2%     | 0.2%     |
| Threshold                      | 0.2%     | 0.1%     | 0.2%     |
| Collect Sample?                | No       | Yes      | No       |
| Collection Rate below average? | Yes      | No       | No       |

FIG. 3

DATA COLLECTION DEVICE AND METHOD

BACKGROUND OF THE INVENTION

1. Field of Invention

This invention relates generally to data storage, and more particularly to the data collection and storage of dynamic data, for example, in condition based monitoring of machinery conditions.

2. Description of Related Art

In condition based monitoring, two types of data are generally referred to when describing the system: static, and dynamic. According to known condition based monitoring standards, for example the API 670 standard, when discussing data associated with condition monitoring, a good initial separation is static versus dynamic. With a radial displacement probe, the static portion can be classified as an overall amplitude or with filtering and a speed reference can be broken into a filtered amplitude and phase, typically 1×, 2×, etc. If the dynamic portion of the data is also captured, additional information can be displayed in the form of time waveforms, orbits, spectrum, and many others. This differentiation is also applicable for velocity probes, accelerometers, load cells, microphones, strain gauges, and dynamic pressure transducers.

Static Data is data that describes the quantitative characteristics of the measured parameter. Static data can also include quantitative values describing the conditions under which the parameter was measured. For predictive maintenance purposes, static data is typically presented in various forms of trend plots and displays/lists of current values. Examples of static data include vibration amplitude, phase lag angle, frequency, average shaft position, shaft rotate speed, time, date, monitor alarm, and OK status. The static portion of a radial proximity probe should include the shaft position information, which is in the gap voltage. The combination of "x" and "y" shaft position information produces the Shaft Centerline Plot.

Dynamic Data is data (steady state or transient) which contain that part of the transducer signal representing the dynamic (e.g., vibration) characteristics of the measured variable. Typical dynamic data presentations include orbit, timebase waveform, spectrum, polar, bode, cascade, and waterfall plots. From this data, it is possible to derive static data signal parameters, such as amplitude; frequency filtered amplitude, and phase lag angle.

For static data there are known methods for efficiently storing this data. The inventor has discovered that this is not the case for dynamic data. A single waveform may contain numerous (e.g., 2048 or more) samples of raw data. This makes dynamic data often much bulkier than static data. Traditionally dynamic data is collected using two techniques. One technique is to collect a waveform at a fixed interval, typically two minutes or more in length. The second technique is to collect data on exception (delta rpm, alarm event, transient modes). When the exception occurs any and all waveforms buffered in a device are sent to the historian for storage. Following that waveforms are collected as fast as the device is capable until the exception state is completed. This approach to dynamic data collection leads to many terabytes of storage and many waveforms for users to look through.

Dynamic data can fill a large amount of hard drive space when trended over time. Initial calculations show that if a traditional approach to collection is used, where samples are stored at a fixed interval, many terabytes of hard drive space will be required each year just to hold all the data. Most of this data is the same, as machines generally run at a steady unchanging state. A large percentage of this data is not important to users as it is largely repeated values inefficiently taking up valuable storage space. Having the most important data, for example, when machine conditions change, is critical. For data collection the inventors have discovered an approach to automatically optimize data storage requirements, the amount of data (e.g., number of waveforms) collected, and the relevance of each data sample for improved data storage efficiency by distinguishing, selecting, collecting and storing the most important data without human intervention.

All references cited herein are incorporated herein by reference in their entireties.

BRIEF SUMMARY OF THE INVENTION

This summary is provided to introduce a selection of concepts in a simplified form that are further described below in the detailed description. This summary is not intended to identify essential features of the claimed subject matter, nor is it intended for use in determining the scope of the claimed subject matter.

In accordance with an example of the invention, a computer-implemented method for controlling the saving of data within a computer system including a client computer, a server, a data storage medium which are connected via a communication network, and a computing arrangement of at least one of the client computer and the server, the computing arrangement having a data historian and a dynamic data storage allocation module is described. The exemplary method includes the data historian accessing data samples from a machine data source, each accessed data sample having a respective percentage of danger value, the dynamic data storage allocation module determining an interestingness value for the accessed data samples in accordance with the percentage of danger values, the dynamic data storage allocation module determining whether the interestingness value for the accessed data samples exceeds an interestingness threshold, the computing arrangement collecting and storing collected data samples that exceed the interestingness threshold in the data storage medium, and the dynamic data storage allocation module modifying the interestingness threshold based on the saving of the collected data samples to control the saving of subsequently accessed data samples from the machine data source.

The exemplary method may include the dynamic data storage allocation module comparing each accessed data sample with a prior data sample to determine the respective percentage of danger value for each accessed data sample. The method may also include the dynamic data storage allocation module comparing the respective percentage of danger value for one of the accessed data samples with the respective percentage of danger value for a prior one of the accessed data samples to determine the interestingness value of the one of the accessed data samples. The method may further include the computing arrangement collecting and storing a desired number of the accessed data samples having the highest interestingness value in the data storage medium. The method may still include the dynamic data storage allocation module decreasing the interestingness threshold when the saving of the collected data samples is below a desired collection average. The method may further still include the dynamic data storage allocation module increasing the interestingness threshold when the interestingness value exceeds the interestingness threshold of a prior time period. In addition, the data historian may discard accessed data samples determined by the dynamic data storage allocation module to have interestingness values not exceeding the interestingness threshold.

It should be noted that on a related aspect, the invention includes a non-transitory computer readable medium containing computer-readable instructions stored therein for causing a computer processor to perform the steps of the exemplary method discussed herein.

In accordance with another example of the invention, a storage allocation system configured to efficiently store data in a data storage medium within a computer system is described, with the system including a computing apparatus of at least one of a client computer and a server, and the computing arrangement having a data historian and a dynamic data storage allocation module. The data historian is configured to access data samples from a machine data source, with each accessed data sample having a respective percentage of danger value. The dynamic data storage allocation module is configured to determine an interestingness value for the accessed data samples in accordance with the percentage of danger values. The dynamic data storage allocation module is further configured to determine whether the interestingness value for the accessed data samples exceeds an interestingness threshold. The computing arrangement is configured to collect and store collected data samples that exceed the interestingness threshold in the data storage medium. The dynamic data storage allocation module is also configured to modify the interestingness threshold based on the saving of the collected data samples.

While not being limited to a particular theory, the data samples are described as preferably being waveforms indicating transient machine conditions or transient machine condition data samples. The exemplary system may also include the data historian configured to discard accessed data samples determined by the dynamic data storage allocation module to have interestingness values not exceeding the interestingness threshold. In examples of the invention, the dynamic data storage allocation module is configured to compare each accessed data sample with a prior data sample to determine the respective percentage of danger value for each accessed data sample. The dynamic data storage allocation module may also be configured to compare the respective percentage of danger value for one of the accessed data samples with the respective percentage of danger value for a prior one of the accessed data samples to determine the interestingness value of the one of the accessed data samples. In addition, the dynamic data storage allocation module maybe configured to decrease the interestingness threshold when the saving of the collected data samples is below a desired collection average and/or to increase the interestingness threshold when the interestingness value exceeds the interestingness threshold of a prior time period. The computing arrangement maybe configured to store a desired number of the accessed data samples having the highest interestingness value in the data storage medium, and may collect the data samples in the client computer.

Further scope of applicability of the present invention will be apparent from the detailed description set forth hereinafter. However, it should be understood that the detailed description and specific examples, while indicating preferred embodiments of the invention, are given by way of illustration only, and that the invention is not limited to the precise arrangements and instrumentalities shown, since the invention will become apparent to those skill in the art from this detailed description.

BRIEF DESCRIPTION OF SEVERAL VIEWS OF THE DRAWINGS

The invention will be described in conjunction with the following drawings in which like reference numerals designate like elements and wherein:

FIG. 2 is an exemplary table illustrating selection and storing with the dynamic data storage allocation system;

FIG. 3 is another exemplary table illustrating selection and storing with the dynamic data storage allocation system;

DETAILED DESCRIPTION OF THE INVENTION

The present invention will be illustrated in more detail with reference to the accompanying drawings, and which preferred embodiments of the invention are shown. This invention may, however, be embodied in many different forms and should not be construed as limited to the embodiments set forth below. Rather, these exemplary embodiments are provided so that this disclosure will be thorough and complete, and will fully convey the scope of the invention to those skilled in the art.

Figure 1:
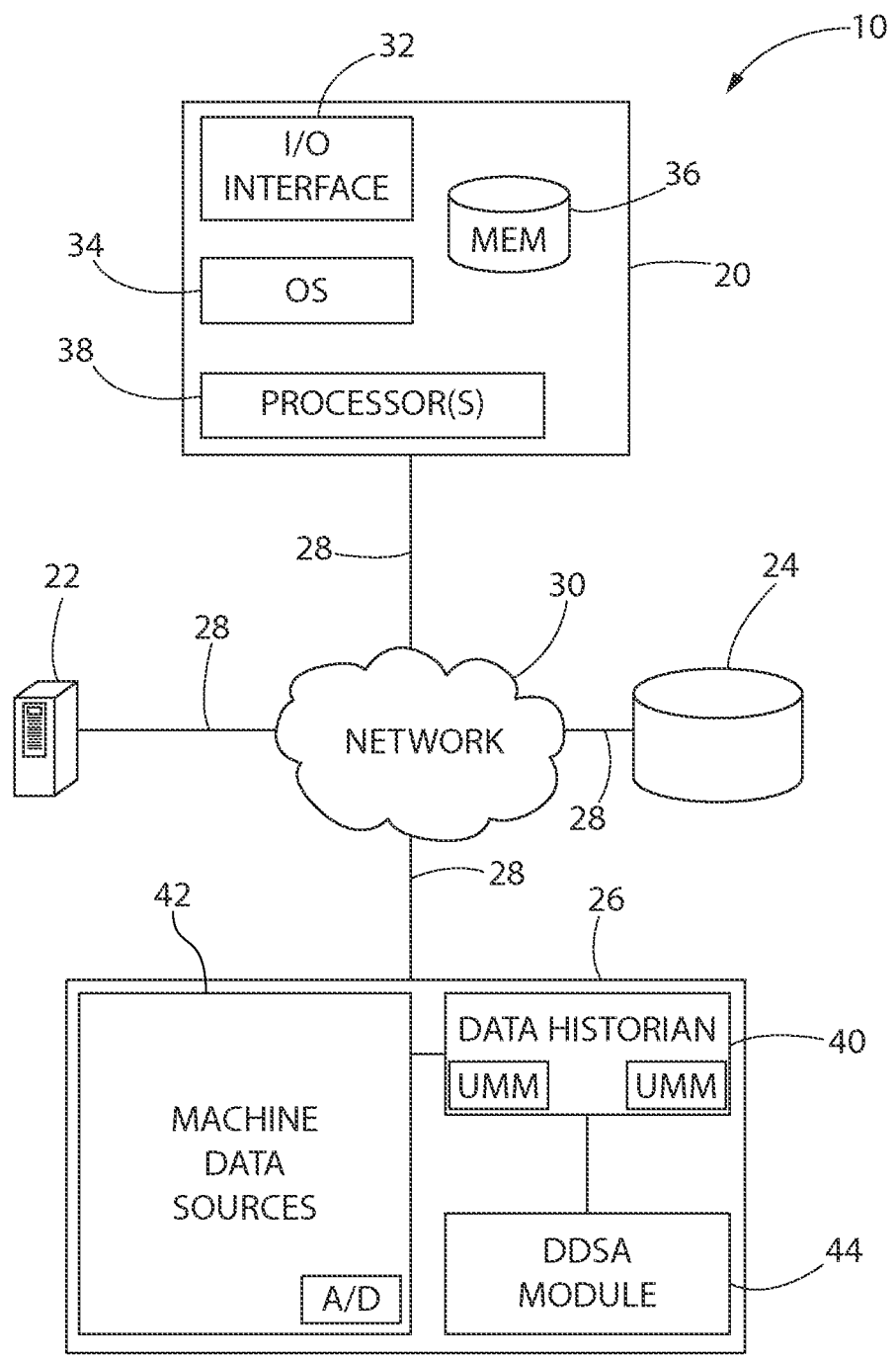
FIG. 1 is a block diagram of an exemplary data processing environment that is used to implement the dynamic data storage allocation system of an exemplary embodiment of the invention.

Referring now in greater detail to the various figures of the application, wherein like-referenced characters refer to like parts, a general communication environment including an exemplary dynamic data storage allocation system 10 of the invention is illustrated in FIG. 1. With reference to FIG. 1, a block diagram is provided illustrating the exemplary dynamic data storage allocation system 10 in which embodiments of the present invention may be employed. It should be understood that this and other arrangements described herein are provided only as examples. Other examples, and elements (e.g., communications, components, devices, features, functions, interfaces, machines, structure, apparatus and arrangements thereof) can be used in addition to or in alternative to those shown and discussed, and some arrangements and elements may be omitted as would be understood by a skilled artisan. Moreover, many of the elements described herein are functional entities that may be implemented as discrete or distributed elements or in combination with other elements, and in any suitable location as understood by a skilled artisan. It should also be understood that various functions described or inferred herein as being performed by one or more entities may be executed by any combination of hardware, software and firmware. For example, such various functions may be performed by a computer processor executing computer-readable instructions (e.g., program code) stored in memory.

FIG. 1 depicts an exemplary dynamic data storage allocation system 10 (e.g., computer system) that may include a client computer 20, a server 22, data storage medium 24, a computing arrangement 26, and communication connections 28 there between. Each of the devices shown in FIG. 1 may be any type of computing apparatus, such as the computer 20 described in greater detail below. The devices may communicate with each other via a network 30, which may include, without limitation, one or more local area networks and or wide area networks. The network 30 may include a packet-switched network, preferably an IP based network, i.e., a communication network having a common layer three IP layer, such as the Internet. The network 30 may also include a telecommunication system comprising circuit-switched telephony networks and packet-switched telephony networks. The client computer 20 may include one or more mobile communication terminals, e.g., cellular phones, capable to send/receive and process data. The circuit-switched networks may be, e.g., Public Switched Telephone Networks (PSTN), Integrated Services Digital Networks (ISDN), Global System for Mobile Communication (GSM), or Universal Mobile Telecommunication Services (UMTS) networks.

The client computer 20 may provide a vehicle for communicating, creating, building, compiling, displaying and executing elements of the invention. Further, the client computer 20 may facilitate the communication of information between a user of the client and one or more components of the dynamic data storage allocation system 10. The dynamic data storage allocation system 10 is but one example of a suitable computing environment and is not intended to suggest any limitation as to the scope of use or functionality of the invention. Neither should the dynamic data storage allocation system 10 be interpreted as having any dependency or requirement relating to any one or combination of modules/components illustrated.

The client computer 20 may include an I/O interface 32, an operating system 34, memory 36 and a processor(s) 38 directly or indirectly coupled therebetween via a bus (not shown but including, for example, an address bus, a data bus, a combination thereof). The I/O interface 32 may include inputs, outputs, communication modules, and display or other user interactive modules for communication within the client computer 20 and external with other components of the dynamic data storage allocation system 10. Exemplary I/O interface members include but are not limited to one or more keyboards, mouse, display devices, microphones, speakers, printers, modems, joysticks, controllers, remotes, wireless devices, transceivers, etc.

The operating system 34 may include a set of programs that manage the computer hardware resources and provides common services for application software. The memory 36 may include database and computer storage media in the form of volatile and/or nonvolatile memory that may be removable. Exemplary memory includes and is not limited to hard drives, solid-state memory, optical drives, etc. The processor 38 includes one or more processors that read, process and execute data and instructions from various sources from the client computer 20 or other entities (e.g., servers 22, data storage medium 24, network 30).

Still referring to FIG. 1, the server 22 may include a client computer 20 as the server. Like the client computer 20, the server 22 may include an I/O interface 32, an operating system 34, memory 36 and a processor(s) 38 directly or indirectly coupled via a bus. Further, the server 22 (and the client computer 20) may be implemented as one or more servers with a peer-to-peer and/or hierarchical architecture.

The functionalities of the dynamic data storage allocation system 10 provided by the client computer 20 and server(s) 22, with or without connection with the data storage medium 24, may be realized as separate, independent units or in a de-centralized structure where the functionalities are provided by a plurality of interdependent de-centralized components and devices. For example, while the client computer 20 and the server 22 represent distinct computing devices used in implementing examples of the invention, it is understood that numerous computing devices may be implemented to perform examples of the invention. The data storage medium 24 is located within one or more computing devices of the client computer 20 (e.g., memory 36) and/or the server 22, and/or is assessable as a single unit or a plurality of distributed units via the network 30.

The computing arrangement 26 is a computing apparatus for implementing aspects of the invention. As such, the client computer 20 and server(s) 22 may be incorporated with the computing arrangement 26. In other words, the computing arrangement 26 may include components included as a whole or in part in the client computer 20, in one or more of the servers 22, in a stand-alone independent computing device (e.g., data storage medium) accessible via the network 30, or any combination thereof. For example, the computing arrangement 26 may include non-transitory computer readable medium as part of the memory 36 or the data storage medium 24 containing computer-readable instructions therein for causing a computer processor 38 within the computing arrangement 26 to perform the data gathering, selection, allocation and efficient storing providing a technical solution of the invention. Accordingly, reference to the computing arrangement 26 may include, yet not be limited to, a reference to the client computer 20 and the server(s) 22.

While not being limited to a particular theory, the computing arrangement 26 includes tools, platforms and an environment for developing and deploying the dynamic data storage allocation system of the invention. In an exemplary embodiment, the computing arrangement 26 includes a dynamic data interface as a data historian 40 in communication with a data source 42 and with a dynamic data storage allocation module 44. The data historian 40 accesses and collects data samples (e.g., high speed data samples including temperature, pressure, flow, vibration or trend data) from a data source 42 (e.g., pump, valve, sensor, actuator, motor, transformer, machine data source) associated with transient machine conditions including startup, event, alarm, changing state, coastdown and shutdown. The data historian 40 communicates with or includes a monitoring system rack that may include monitoring modules (e.g., universal monitoring modules (UMMs)) configured for vibration, acceleration, position, temperature, and velocity measurements on rotating and/or reciprocating machinery. As such, the data historian 40 may include the I/O interface 32, operating system 34, memory 36 and processor 38 of the client computer 20 or the server 22.

The dynamic data storage allocation module 44 communicates with the data historian 40 to determine what data is sufficiently "interesting" to collect and save in the data storage medium 24. The dynamic data storage allocation module 44 includes any combination of hardware, software including computer-readable instructions, and firmware of the client computer 20 and/or server 22 required to automatically distinguish the dynamic data that is interesting enough to collect and save, as discussed in greater detail below. For example, such various functions are purposefully designed to be provided by the computer processor 38 executing computer-readable instructions (e.g., program code) stored in memory 36. The dynamic data storage allocation module 44 may be configured as part of a condition monitoring software (CMS) system. In particular, the dynamic data storage allocation module is configured to include or use the I/O interface 32, operating system 34, memory 36 and processor 38 of the client computer 20 or the server 22 via communication as needed with the connected network 30.

The dynamic data storage allocation module 44 is configured to reduce the amount of storage needed to store dynamic data, and also to store the most interesting dynamic data (e.g., waveforms). Storage of dynamic data is a function of change in static data. Dynamic data is relevant to the extent that it changes from a previous sample. Changes need to be detected for different machinery conditions. Most of these conditions will show up as a change in standard static data such as: Speed, overall vibration, 1× vibration, 2× vibration, asset specific vibrations (Inner Race Ball Pass Frequency as an example), and gap voltages. All are preferred indicators that something interesting is happening.

Static data is used as the input to determine whether or not any particular piece of dynamic data should be stored. Thus the examples change how dynamic data is stored. For example, the dynamic data storage allocation module 44 normalizes static data to a percentage of a danger alarm point (e.g., according to a variance in the data from expected data, prior data, or machine operational data) so that a common scale and unit may be used when determining how much the data is changing. The percentage of danger value is purposefully designed to associate with a likelihood that the data may indicate an alarm point or danger alarm condition. The difference of the percent of danger value against the previous percent of danger will provide an instantaneous change value that will be used to determine how interesting the data is, or what we call an "interestingness" value.

To manage how much data is collected, the dynamic data storage allocation module 44 maintains the "interestingness" threshold. Every collection period the highest ranked waveforms above the threshold are sent via the historian for storage in the data storage medium. The threshold is automatically adjusted based on whether the computing arrangement 26 is collecting too much or too little data, as will be described in greater detail below. This approach automatically optimizes data storage requirements, the amount of data (e.g., number of waveforms) collected, and the relevance of each data sample for improved data storage efficiency by distinguishing, selecting and storing the most important data without human intervention.

FIG. 2 depicts an example of how the dynamic data storage allocation system 10 efficiently stores dynamic data. For period 1, the data historian 40 accesses (e.g., receives) dynamic data of a time period (e.g., about 2.5 ms to about 40 ms) from a machine data source 42, which is understood to include any of numerous data sources (e.g., pump, valve, sensor, actuator, motor, transformer, machine data source) associated with transient machine conditions. The dynamic data storage allocation module 44 compares the received dynamic data to previously received dynamic data from a preceding time period to determine a percentage of danger for period 1 corresponding to an amount of difference between the received data of the adjacent time periods. The dynamic data storage allocation module 44 then compares the percentage of danger for period 1 to the percentage of danger from the prior time period (e.g., Period 0) to determine an interestingness value for Period 1. Next, the dynamic data storage allocation module 44 compares the interestingness value to the interesting threshold to determine if the dynamic data of period 1 should be store in the data storage medium 24.

The interestingness threshold is calculated by the dynamic data storage allocation module 44 to set a limit for determining how much received data is collected (e.g., stored) and make the collection less susceptible to noise. In particular, the interestingness threshold is calculated to track the maximum interestingness value by attacking (e.g., rising) up to or decaying down to the last value. In this manner, the threshold may be adjusted to regulate the data collection rate. For example the threshold rises up or decays down according to prior interestingness values and/or if the prior time period data sample was stored. The threshold may be increased or decreased as a percentage of the existing threshold value to reduce volatile threshold changes and increase consistency in storing more interesting data regardless of noise. That is, the threshold change may be limited to a percentage over time (e.g., 1-5% per minute). Moreover, the threshold may be adjusted by a rate where the prior threshold is increased or decreased by a percentage of the prior threshold or by a percentage of the difference between the prior threshold and the interestingness value of a current data sample. Maximum and minimum thresholds may be provided to the system 10 to keep the threshold within a desired range. While not being limited to a particular theory, in the examples, all data above the threshold is published to the data historian 40, that is, collected for storage. A minimum threshold (e.g., 0.1%) may be set as attributed to steady state vibration due to process changes from forcing a data collection. The interestingness threshold may initially be set to a desired threshold, or may be set to a default threshold of the minimum threshold to ensure that some data samples are stored.

In period 1 the computing arrangement 26 does not collect data because the interestingness value is not greater than the interestingness threshold. In the example illustrated in FIG. 2, this normally causes the dynamic data storage allocation module 44 to lower the interestingness threshold so that some data is collected during a subsequent period. However, the interestingness threshold in period 1 is equal to the minimum threshold of 0.1%, so the threshold is not lowered in period 2. For period 2, the data historian 40 accesses (e.g., receives) dynamic data of a next time period from a machine data source 42. The dynamic data storage allocation module 44 determines a percentage of danger for period 2, and then the interestingness value as the absolute value difference between the percentage of dangers of periods 2 and 1. The interestingness value of period 2 (1.9%) is greater than the interestingness threshold of period 2 (0.1%), so the computing arrangement 26 collects the data sample for subsequent storage in the data storage medium 24 and increases the interesting threshold for period 3. The threshold tracks the max value but is preferably limited on how much it can change by an attack and decay rate. While not being limited to a particular theory, the attack and decay rate may be limited to half the difference between the interesting value and threshold, for example.

Still referring to FIG. 2, in period 3, the interestingness value of 0.8% (e.g., |2.2%-3.0%|) is less than the interestingness threshold of 1.0%, so the computing arrangement 26 does not collect data. Since the collecting data is based on change, high absolute values are no more likely to cause a collection than low absolute values. The computing arrangement 26 may handle any scales and units in order to make all the data relative, as readily understood by a skilled artisan.

In some examples of the invention, the dynamic data storage allocation module 44 may look to additional information to determine whether to adjust the interestingness threshold. FIG. 3 depicts another example of how the dynamic data storage allocation system 10 efficiently stores dynamic data. In each time period 1-3, the data historian 40 accesses (e.g., receives) dynamic data from the machine data source 42. The dynamic data storage allocation module 44 determined the percentage of danger for periods 1-3 as 1.2%, 1.4%, and 1.6%, respectively, with each period having an interestingness value of 0.2%. The computing arrangement 26 does not collect data from period 1 because the interestingness value is not greater than the interestingness threshold of 0.2%. In the previously discussed example illustrated in FIG. 2, this non collection of the data would causes the dynamic data storage allocation module 44 to lower the interestingness threshold so that some data is collected during a subsequent period. However, in the example illustrated in FIG. 3, the dynamic data storage allocation module 44 provides a different analysis to determine if the interestingness threshold should be changed. It may be preferable to have the dynamic data storage allocation system 10 save a desired percentage of the data received by the data historian 40. Under this situation, the dynamic data storage allocation module 44 tracks the collection or storage rate of data samples and modifies the interestingness threshold based on a comparison between the tracked collection for storage rate and a desired average collection for storage rate.

Referring to FIG. 3, the data associated with period 1 is not collected because the interestingness value is not greater than the threshold of 0.2%. After this non-collection, the collection rate is below the desired average collection rate (e.g., average collection for storage rate), and the dynamic data storage allocation module 44 lowers the threshold so that some data is more likely to be collected during a subsequent period. After period 2, the data is collected, and the collection rate is not below the desired average, so the dynamic data storage allocation module 44 increases the threshold.

Figure 4:
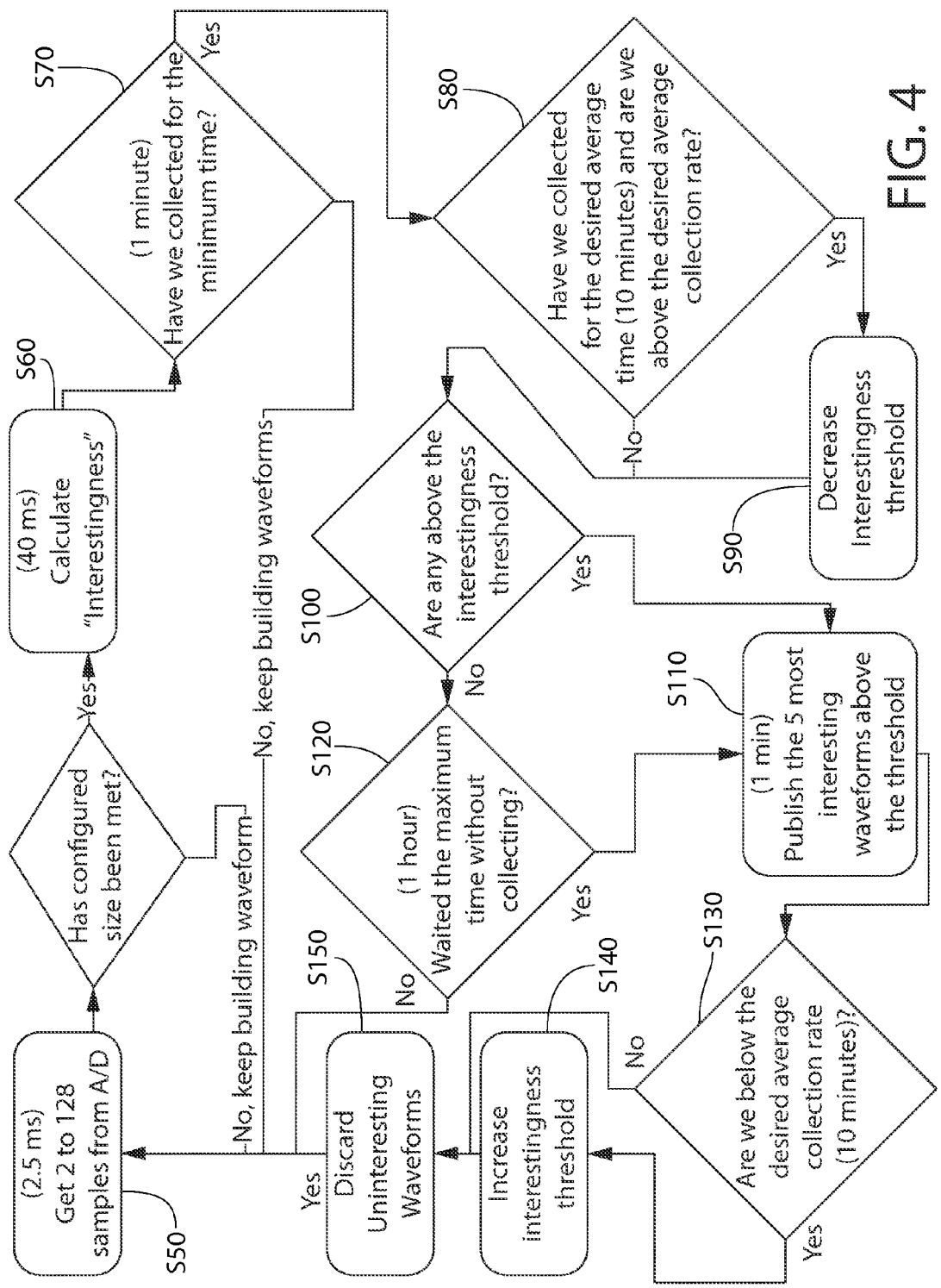
FIG. 4 is a diagram showing a flowchart of an exemplary dynamic data storage allocation process purposefully designed for use with the dynamic data storage allocation system.

FIG. 4 is an exemplary state diagram of a method of data storage carried out by the system 10. This method illustrates, for example, how feedback could be used to regulate the data collection rate. At step S50, the data historian 40, which may be part of a PI system, accesses (e.g., receives) data samples from a machine data source 42 via an analog-digital converter (A/D). While not being limited to a particular theory, the data samples preferably are formatted as waveforms but may be in other data forms as understood by a skilled artisan. It is also understood that the A/D may be part of the data historian, the data source or in communication there between. When the configured size of data samples is met, then at step S60 the dynamic data storage allocation module determines an interestingness value for the time period, for example, as described above. The data historian 40 continues to collect data samples (e.g., waveforms) at least for a minimum number of time periods or time (e.g., one minute) as noted at step S70. These collected data samples may be saved temporarily in memory 36 associated with the data historian (e.g., memory 36, UMM).

After data samples have been collected for the minimum time, the dynamic data storage allocation module 44 determines if the computing arrangement 26 has collected for the desired average time (e.g., 10 minutes) and is above the desired average collection rate at step S80. If yes, then at step S90, the dynamic data storage allocation module 44 decreases the interestingness threshold. In other words, if the dynamic data storage allocation module determines that the computing arrangement 26 has not collected for more than the desired average time (e.g., 10 minutes), then the dynamic data storage allocation module 44 decreases the interestingness threshold to make the storage of collected data more likely. If no, then at step S100, the dynamic data storage allocation module 44 determines if any of the collected data samples are above the interestingness threshold.

If the data historian 40 has received data samples above the interestingness threshold, then at step S110 the computing arrangement 26 publishes (e.g., saves) a number (e.g., five, up to five) of most interesting data samples (e.g., waveforms) above the threshold. If the data historian has not received data samples above the interesting threshold over a maximum time (e.g., one hour) without collecting (step S120), then at step S110 the computing arrangement 26 publishes (e.g., saves) a desired number (e.g., five, up to five) of most interesting data samples (e.g., waveforms), with the desired number preferably predetermined by a client or user. In this manner, the computing arrangement 26 periodically publishes, that is, saves, the most interesting data samples at a fairly slow rate of the maximum time. The system 10 may store data at a faster rate, as will be discussed in greater detail below. If the data historian has not received data samples above the interesting threshold (step S100) and we have not waited the maximum time without collecting (step S120), then the data historian continues to receive data samples from one of the data sources at Step 50.

After the computing arrangement 26 publishes (e.g., saves) a number (e.g., five, up to five) of most interesting waveforms at step S110, the dynamic data storage allocation module 44 determines if the computing arrangement is collecting data samples below the desired average collection rate (e.g., 10 minutes) at step S130. If yes, then at step S140, the dynamic data storage allocation module 44 increases the interestingness threshold. For clarity, it is understood that below the desired average collection rate means collecting faster than desired (e.g., a collection rate of 8 minutes is below an exemplary desired collection rate of 10 minutes), so the interestingness threshold should increase to slow down the collection rate. If the computing arrangement is not collecting data samples below the desired average collection rate at step S130, or after the dynamic data storage allocation module 44 increases the interestingness threshold at step S140, the data historian 40 discards the uninteresting data samples, that is, the data samples not above the respective interestingness threshold, at step S150, and continues to receive data samples from one of the data sources at Step 50.

Figure 5:
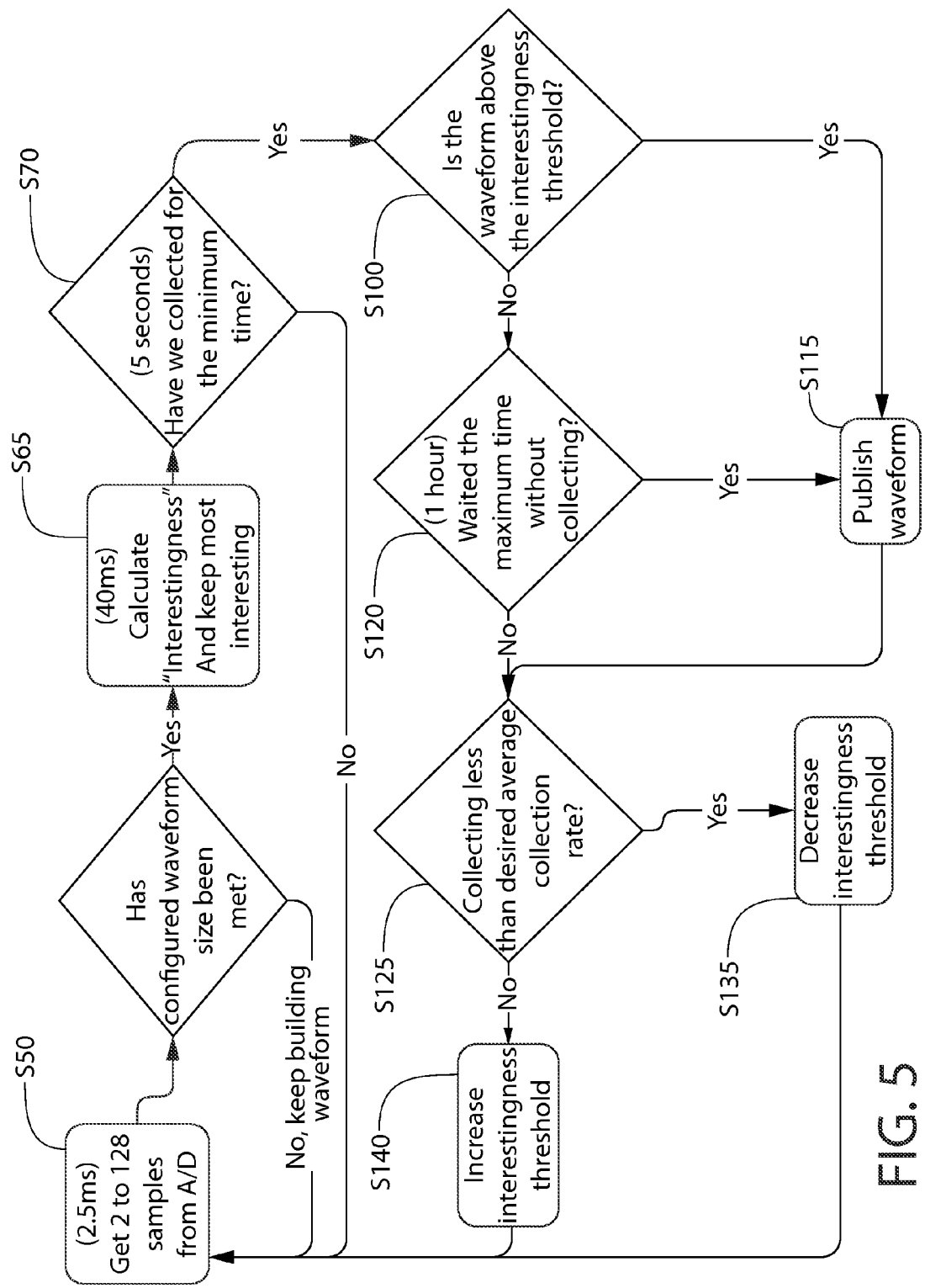
FIG. 5 is a diagram showing a flowchart of another exemplary dynamic data storage allocation process purposefully designed for use with the dynamic data storage allocation system.

FIG. 5 illustrates another exemplary state diagram of a method of data storage carried out by the system 10. The diagram of FIG. 5 is similar to the diagram of FIG. 4, with the example of FIG. 5 purposefully designed to store data at a faster rate than the example of FIG. 4. At step S50, the data historian 40, accesses (e.g., receives) data samples (e.g., waveforms) from a machine data source 42 via an analog-digital converter (A/D). When the configured size of data samples is met, then at step S65 the dynamic data storage allocation module 44 determines an interestingness value for the time period, for example, as described above. Further, at step S65, the data historian collects the most interesting data samples (e.g., waveforms) as determined by the allocation module. For example, the dynamic data storage allocation module 44 determines the most interesting data samples to keep as data samples that are more interesting (e.g., higher interestingness value, higher percentage of danger) than the previous data sample. The data historian 40 continues to collect the most interesting data samples at least for a minimum number of time periods or time (e.g., 5 seconds) as noted at step S70. These collected most interesting data samples may be saved temporarily in the data historian 40 or memory 36.

After data samples have been collected for the minimum time, then at step S100, the dynamic data storage allocation module 44 determines if any of the collected data samples are above the interestingness threshold. If the data historian 40 has received data samples above the interestingness threshold, then at step S115 the computing arrangement 26 publishes (e.g., saves) the collected data samples (e.g., waveforms) above the threshold to the data storage medium 24. If the data historian has not received data samples above the interesting threshold (step S100) and has not collected additional most interesting data samples over a maximum time (e.g., one hour) at step S120, then at step S115 the computing arrangement 26 publishes (e.g., saves) the collected most interesting data samples (e.g., waveforms) to the data storage medium 24.

After publication, or saving, of the data samples at step 115, or after the computing arrangement 26 has not collected data samples for the maximum time at step 120, the dynamic data storage allocation module 44 determines if the computing arrangement is collecting data samples at less than the desired average collection rate (e.g., 10 minutes) at step S125. In this example, it is understood that collecting data samples at less than the desired average collection rate means collecting less data samples than desired. So if the computing arrangement 26 is collecting less than desired, then at step S135, the dynamic data storage allocation module 44 decreases the interestingness threshold to increase the rate of storage of the most interesting data samples above the threshold. Alternatively, if the computing arrangement 26 is not collecting less data samples than desired, then at step S140, the dynamic data storage allocation module 44 increases the interestingness threshold to decrease the rate of storage of the most interesting data samples above the threshold. It is understood that the data historian 40 discards the uninteresting data samples, and continues to receive additional data samples from one of the data sources at Step 50.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

It is understood that the dynamic data storage allocation system and methods thereof described and shown are exemplary indications of preferred embodiments of the invention, and are given by way of illustration only. In other words, the concept of the present invention may be readily applied to a variety of preferred embodiments, including those disclosed herein. It will be understood that certain features and sub combinations are of utility, may be employed without reference to other features and sub combinations, and are contemplated within the scope of the claims. Not all steps listed in the various figures need be carried out in the specific order described.

While the invention has been described in detail and with reference to specific examples thereof, it will be apparent to one skilled in the art that various changes and modifications can be made therein without departing from the spirit and scope thereof. Without further elaboration, the foregoing will so fully illustrate the invention that others may, by applying current or future knowledge; readily adapt the same for use under various conditions of service.

What is claimed is:

1. A computer-implemented method for controlling the saving of data within a computer system including a client computer, a server, a data storage medium which are connected via a communication network, and a computing arrangement of at least one of the client computer and the server, the computing arrangement having a machine data source and a dynamic data storage allocation module, the method, comprising:
   (a) the dynamic data storage allocation module accessing data samples from the machine data source, and calculating for each accessed data sample a respective percentage of a predetermined danger value;
   (b) the dynamic data storage allocation module determining an interestingness value for each of the accessed data samples based on each sample's calculated percentage of said predetermined danger value;
   (c) the dynamic data storage allocation module determining whether the interestingness value for each of the accessed data samples exceeds an interestingness threshold;
   (d) in response to the determining by the dynamic data storage allocation module, the computing arrangement storing at least one of the accessed data samples in the data storage medium, wherein the at least one of the accessed data samples having interestingness values exceed the interestingness threshold; and then
   (e) the dynamic data storage allocation module modifying said interestingness threshold based on the interestingness values of the stored at least one of the accessed data samples to control storing of subsequently accessed data samples from the machine data source.

2. The computer-implemented method of claim 1, further comprising, in step (a), the dynamic data storage allocation module comparing each accessed data sample with expected data to determine the respective percentage of the predetermined danger value for each accessed data sample.

3. The computer-implemented method of claim 2, further comprising, in step (b), the dynamic data storage allocation module comparing the respective percentage of the predetermined danger value for a first accessed data sample with the respective percentage of the predetermined danger value for a second accessed data sample to determine the interestingness value of the second accessed data sample.

4. The computer-implemented method of claim 1, further comprising, in step (b), the dynamic data storage allocation module comparing the respective percentage of the predetermined danger value for a first accessed data sample with the respective percentage of the predetermined danger value for a second accessed data samples to determine the interestingness value of the second accessed data sample.

5. The computer-implemented method of claim 1, wherein in step (d), the computing arrangement collects the data samples in the machine data source.

6. The computer-implemented method of claim 1, further comprising, before step (e), the computing arrangement collecting and storing a predetermined number of the accessed data samples having highest interestingness values in the data storage medium.

7. The computer-implemented method of claim 1, wherein said modifying comprises decreasing the interestingness threshold when an amount of the stored at least one of the accessed data samples is below a predetermined collection average.

8. The computer-implemented method of claim 1, wherein said modifying comprises increasing the interestingness threshold when the interestingness values corresponding to the stored at least one of the accessed data samples exceed the interestingness threshold of a prior time period.

9. The computer-implemented method of claim 1, further comprising a data historian discarding all accessed data samples determined by the dynamic data storage allocation module to have interestingness values not exceeding the interestingness threshold.

10. Non-transitory computer readable medium containing computer-readable instructions stored therein for causing a computer processor to perform the steps of the method according to claim 1.

11. A storage allocation system configured to efficiently store data in a data storage medium within a computer system, the system comprising
- a computing apparatus of at least one of a client computer and a server,
- a computing arrangement having a machine data source and a dynamic data storage allocation module,
- the dynamic data storage allocation module configured to access data samples from the machine data source, and calculating for each accessed data sample a respective percentage of a predetermined danger value,
- the dynamic data storage allocation module further configured to determine an interestingness value for each of the accessed data samples based on each sample's calculated percentage of said predetermined danger value,
- the dynamic data storage allocation module further configured to determine whether the interestingness value for each of the accessed data samples exceeds an interestingness threshold,
- in response to the determining by the dynamic data storage allocation module, the computing arrangement configured to store at least one of the accessed data samples in the data storage medium, wherein the at least one of the accessed data samples having interestingness values exceed the interestingness threshold, and
- the dynamic data storage allocation module also configured to modify the interestingness threshold based on the interestingness values of the stored at least one of the accessed data samples to control storing of subsequently accessed data samples from the machine data source.

12. The storage allocation system of claim 11, further comprising the dynamic data storage allocation module configured to compare each accessed data sample with a single predetermined prior data sample to determine the respective percentage of the predetermined danger value for each accessed data sample.

13. The storage allocation system of claim 11, further comprising the dynamic data storage allocation module configured to compare the respective percentage of the predetermined danger value for a first accessed data sample with the respective percentage of the predetermined danger value for a second accessed data sample to determine the interestingness value of the second accessed data sample.

14. The storage allocation system of claim 11, further comprising the computing arrangement being configured to store a predetermined number of the accessed data samples having highest interestingness values in the data storage medium.

15. The storage allocation system of claim 11, the computing arrangement being configured to collect the data samples in the client computer.

16. The storage allocation system of claim 11, the data samples being waveforms indicating transient machine conditions.

17. The storage allocation system of claim 11, the data samples being transient machine condition data samples of a machine.

18. The storage allocation system of claim 11, further comprising the dynamic data storage allocation module being configured to decrease the interestingness threshold when an amount of the stored at least one of the accessed data samples is below a predetermined collection average.

19. The storage allocation system of claim 11, further comprising the dynamic data storage allocation module configured to increase the interestingness threshold when the interestingness values corresponding to the stored at least one of the accessed data samples exceed said interestingness threshold of a prior time period.

20. The storage allocation system of claim 11, further comprising a data historian being configured to discard all accessed data samples determined by the dynamic data storage allocation module to have interestingness values not exceeding the interestingness threshold.

* * * * *